July 20, 1943.  W. R. KOCH  2,324,851
CATHODE RAY MEASURING DEVICE
Filed March 31, 1941
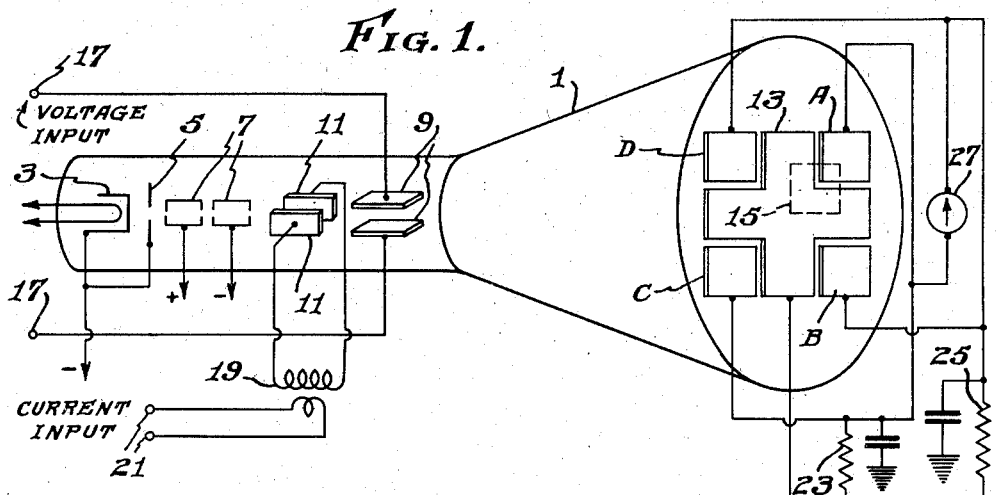
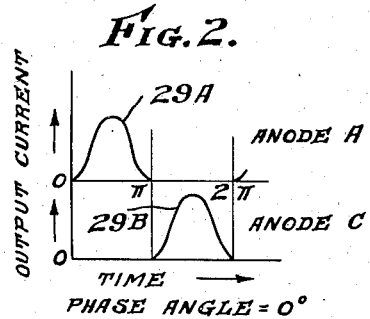
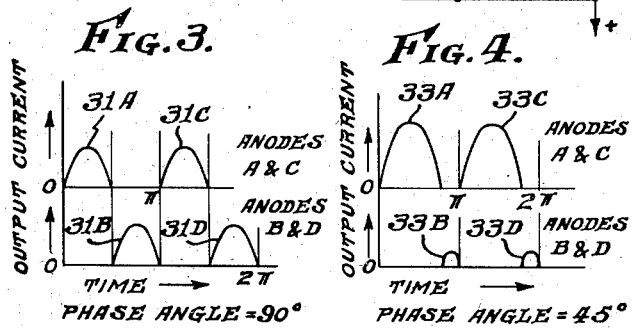
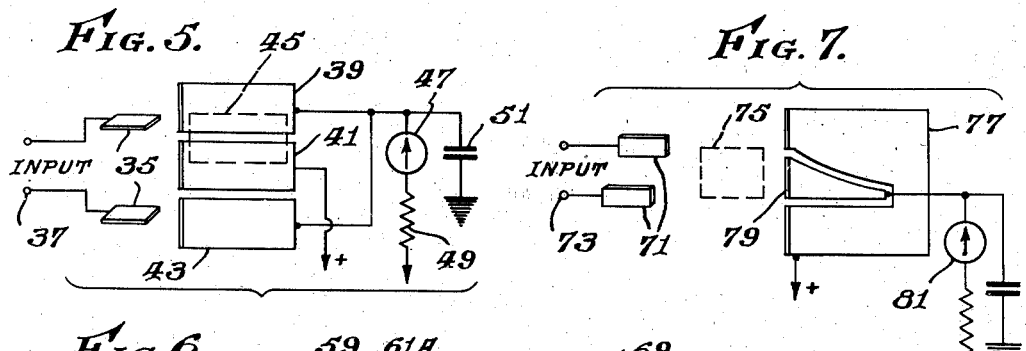
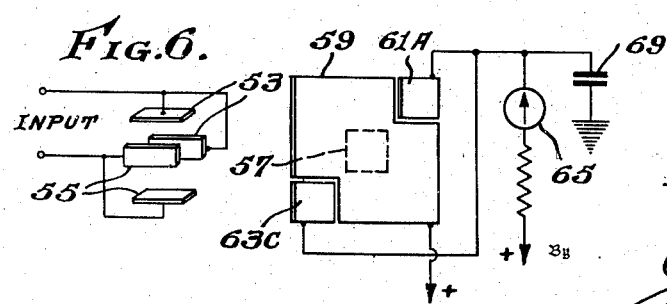
Inventor
Winfield R. Koch
Attorney Patented July 20, 1943

2,324,851

UNITED STATES PATENT OFFICE 2,324,851

CATHODE RAY MEASURING DEVICE

Winfield R. Koch, Haddonfield, N. J., assignor to Radio Corporation of America, a corporation of Delaware Application March 31, 1941, Serial No. 386,147

8 Claims. (Cl. 171—95)

This invention relates to cathode ray tube measuring devices and particularly to an improved cathode ray tube device for measuring power and average, effective or logarithmic functions of current or voltage.

Since the cathode ray is inertialess it provides an excellent means for measuring power at audio or radio frequencies. In the instant invention instead of employing the conventional small spot which is generally used in cathode ray tubes a square image of the cathode is formed on target electrodes which will be hereinafter described. By suitably shaping the target electrodes and by applying the cathode ray beam deflecting voltages the device lends itself to the measurement of power or various functions of the applied current or voltage. The indications may be obtained on a second cathode ray tube or on a conventional D'Arsonval type of meter.

One of the objects of the invention is to provide improved means for measuring electric power. Another object is to provide an improved cathode ray tube for measuring electric power. Another object is to provide an improved cathode ray tube for indicating the magnitude and characteristic of an applied electric force. An additional object is to provide improved means for indicating the power in a high frequency electric wave.

The invention will be described by referring to the accompanying drawing in which Figure 1 is a schematic diagram of an embodiment of the invention used as a power indicating device; Figures 2, 3 and 4 are graphs used in describing the operation of the cathode ray tube power measuring device; and Figures 5, 6 and 7 are schematic circuit diagrams illustrating modifications of the invention used in indicating the magnitude and characteristics of electric forces.

Referring to Fig. 1, within the evacuated envelope 1 of a cathode ray tube are arranged the following electrodes: a cathode 3, an apertured mask 5, focusing electrodes 7, vertical deflecting electrodes 9, horizontal deflecting electrodes 11, and target electrodes 13 and A, B, C and D. The central target electrode 13 forms a Greek cross and the four square electrodes A, B, etc. are symmetrically arranged about the cross to form a square of an area equal to nine times the area of the spot 15. Furthermore, the corner target electrodes A, B, etc. are each of the same area as the spot 15. The spot 15 corresponds to an image of the cathode 3 or to the aperture in the mask 5.

The circuit connections are as follows: The vertical deflecting electrodes 9 are connected to terminals 17 which form the voltage input circuit. The horizontal deflecting electrodes 11 are connected through a current to voltage transformer 19 whose primary is connected to current input terminals 21. The target or anode electrodes A and C are connected together and through a capacity bypassed resistor 23 to the positive terminal of a source of potential not shown. The target electrodes B and D are connected together and through a capacity bypassed resistor 25 to the positive terminal of the potential source. A center type meter 27 is connected between the leads adjoining the target electrodes A and C and B and D, respectively. The remaining target electrode 13 is connected to the positive terminal of the potential source.

By means of conventional D. C. biasing means the spot 15 is focused to just cover the center of the target electrode 13 in the absence of any electric forces applied to the input terminals. This adjustment may be facilitated by applying Willemite or the equivalent to the several target electrodes. At the same time the output meter 27 should indicate zero inasmuch as all of the electronic current of the cathode ray beam will be flowing to the central target electrode 13.

After the initial adjustment of the spot 15 assume that the input terminals are connected to measure the power of an alternating current having a zero phase angle. If the current and voltage of the source are in phase the spot 15 will be deflected along a diagonal between the target electrodes A and C. Furthermore, electronic current of the target electrode A will be proportional to the area covered by the spot or $I_{max} \sin \omega t \times E_{max} \sin \omega t$ at any instant. This is represented by the curves 29A, 29B of Fig. 2 which shows the anode or electronic current of the targets A and C. Inasmuch as the phase angle is zero the spot will not be deflected on the targets B or D. By integrating the curves 29A and 29B the average power over a complete cycle will be obtained. The two currents represented by the curves are added in the output indicating meter 27 so that the power may be indicated directly by calibrating the indicator.

If we now assume that the applied alternating current and voltage have a phase angle of 90° it will be recognized that the spot 15 will follow a circular or elliptical path touching successively target electrodes, A, B, C, D, etc. During the first quarter cycle electronic currents will flow to the target or anode electrode A, during the next quarter cycle the currents will flow to the target electrode B, and so forth. These currents are indicated by the curves 31A, 31B, 31C, 31D. When these currents are applied to the indicating meter 27 no output indication will be obtained because 31A is opposite in phase to 31B and 31C is opposite in phase to 31D. Therefore, the integrated area of the curves 31A, 31B, etc. will be zero which is the recognized case for voltages and currents in quadrature phase.

In the event that the phase angle is 45° the conditions may be represented by the graph Fig. 4 in which the currents are represented by the curves 33A, 33B, 33C, 33D. In this particular example the reactive power is less than the real power and therefore the output meter will indicate correctly the real power applied. If the power had been of the opposite sense or direction in any of the preceding examples, the meter would have deflected in the opposite direction to thus indicate the characteristic of the applied electric force.

While the foregoing analysis has been given for only three angles it should be understood that the indicator 27 will read an amount proportional to $EI \cos \theta$ provided the maximum spot deflection does not extend beyond the outer limits of the several target electrodes. Of course, if the deflection exceeds the principal maximum the output meter will fail to indicate the applied power just as any indicating device fails to indicate correctly if the applied force exceeds the maximum for which the device was designed. In the present device any desired time constant may be provided by suitably selecting the values of the bypass capacitors. The device may be used for either audio frequency, high frequency, or direct currents.

By suitably modifying the shape of the target electrodes the device may be used to indicate the magnitude and characteristics of an applied current or voltage as distinguished from power. One such arrangement is shown in Fig. 5 in which the horizontal deflecting electrodes 35 are connected to the input terminals 37. The target electrodes 39, 41, 43 are three in number and correspond in area to the area of the spot 45. The outer target electrodes are connected together and through a meter 47 and a resistor 49 to the positive terminal of the biasing battery. The meter and resistor are shunted by a capacitor 51. In this arrangement the spot may be either square or rectangular in shape and the output current will be proportional to the average value of the applied electric force.

The modification shown in Fig. 6 is designed for indicating the average squared values of the applied electric force. The input electrodes are connected diagonally in pairs 53, 55, respectively, as shown. The target electrodes form a square having nine times the area of the spot 57. The central electrode 59 is connected to the positive terminal of the biasing battery. The opposite corners of the central target electrode correspond to those of the target electrode of Fig. 1 and are cut away to provide a space for the outer diagonally disposed square electrodes 61A and 63C. The outer electrodes are connected together and hence through the indicating meter 65 and resistor 67 to the positive terminal of the biasing battery. The meter 65 and resistor 67 are shunted by a capacitor 69. In this arrangement the applied forces deflect the spot along the diagonal between the target electrodes 61A and 63C so that the area of the spot intersecting the electrodes forms a square of an area proportional to the deflecting forces. Thus the average value of the output indicating meter corresponds to the average squared value of the applied potential or current.

In the arrangement shown in Fig. 7 the horizontal deflecting electrodes 71 are connected to the input terminals 73. A square or rectangular spot 75 is used. The target electrodes 77, 79 are cut to form a logarithmic or any hyperbolic function. The target electrodes are connected to the positive terminal of the biasing battery and to the output indicating meter 81 in an arrangement similar to that of Fig. 5.

If extremely complexed functions of the applied current or voltage are desired it should be understood that two or more of the described cathode ray indicators may be connected in series so that the input terminals of the second device are connected to the output indicator terminals of the first device. Of course, it will be recognized by those skilled in the art that initial input currents may be amplified before being applied to the deflecting electrodes and likewise the electronic currents flowing to the target electrodes may be amplified before being applied to the output indicator.

Thus the invention has been described as a cathode ray tube device in which the image of the cathode is focused on the target electrodes. The image is formed so that its area taken in conjunction with the shape and areas of the target electrodes will provide electronic currents to the target electrodes proportional to any desired function of the applied voltage or current. Furthermore, the spot and target electrodes may be arranged so that the power of the applied forces may be indicated. If it is desired to read reactive power a 90° phasing means in the input circuit may be employed.

I claim as my invention:

1. A cathode ray measuring device including a cathode, deflecting electrodes and a plurality of target electrodes all lying in the same plane, means including said cathode for forming on at least one of said target electrodes an electron image of said cathode covering at least one dimension of one of said target electrodes and having an area integrally proportional to the total area of said target electrodes, means including said deflecting electrodes for deflecting said image along a predetermined path on and between said target electrodes as a function of the electric quantity to be measured, and means effectively connected to said target electrodes for measuring the electronic currents of said target electrodes as a function of said spot movements to indicate the magnitude and characteristics of said electric quantity.

2. A cathode ray measuring device including a cathode, deflecting electrodes and a plurality of target electrodes all lying in the same plane, means including said cathode for forming on at least one of said target electrodes a square area image of said cathode covering at least one dimension of one of said target electrodes and having an area integrally proportional to the total area of said target electrodes, means including said deflecting electrodes for deflecting said image along a predetermined path on and between said target electrodes as a function of the electric quantity to be measured, and means effectively connected to said target electrodes for measuring the electronic currents of said target electrodes as a function of said spot movements to indicate the magnitude and characteristics of said electric quantity.

3. A cathode ray measuring device including a cathode, deflecting electrodes and five target electrodes forming a square area, means including said cathode for forming an image of said cathode and of a square area one-ninth the area of said five target electrodes on one of said target electrodes, means including said deflecting electrodes for deflecting said image along a predetermined path on and between said target electrodes as a function of the electric quantity to be measured, and means effectively connected to said target electrodes for measuring the electronic currents of said target electrodes as a function of said spot movements to indicate the magnitude and characteristics of said electric quantity.

4. A cathode ray measuring device including a cathode, deflecting electrodes and target electrodes, means including said cathode for forming an electronic image of said cathode on one of said target electrodes, means including said deflecting electrodes for deflecting said image on said target electrodes along one coordinate as a function of the voltage of the source of power to be measured and along another coordinate as a function of the current of said source, and means effectively connected to said target electrodes for measuring the electronic currents of said target electrodes to thereby indicate said power.

5. A cathode ray measuring device including a cathode, deflecting electrodes, and five target electrodes forming a square of nine elementary and uniform areas, four of said elementary areas at the corners forming four of said targets, means including said cathode for forming an electronic image covering the central elementary area, means including said deflecting electrodes for deflecting said image from said central area as a function of the electric quantities to be measured, and means effectively connected to said target electrodes for indicating the electronic currents flowing thereto and thereby indicating the magnitude and characteristics of the applied image deflecting quantities.

6. A cathode ray measuring device including a cathode, deflecting electrodes, and five target electrodes forming a square of nine elementary and uniform areas, four of said elementary areas at the corners forming four of said targets, means including said cathode for forming an electronic image covering the central elementary area, means including said deflecting electrodes for deflecting said image from said central area as a function of the potential and current of the power to be measured, and means effectively connected to said target electrodes for indicating the electronic currents flowing thereto as functions of said image positions to indicate said power.

7. A cathode ray electric quantity measuring device including a cathode, deflecting electrodes and a central and two additional symmetrically arranged target electrodes, means including said cathode for forming an electronic image covering at least one dimension of said central target electrode in the absence of deflecting currents, means including said deflecting electrodes for deflecting said image from said central target electrode to said side electrodes as a function of the electric quantities to be measured, and means for measuring the electronic currents established by said image deflection to indicate the magnitude of said electric quantities.

8. A cathode ray electric quantity measuring device including a cathode, deflecting electrodes and a central and two additional symmetrically arranged target electrodes, means including said cathode for forming an electronc image covering at least one dimension of said central target electrode in the absence of deflecting currents, means including said deflecting electrodes for deflecting said image from said central target electrode to said side electrodes as a function of the square of the electric quantities to be measured, and means for measuring the electronic currents established by said image deflection to indicate the average squared value of said electric quantities.

WINFIELD R. KOCH.